United States Patent [19]

Stange

[11] 4,010,455

[45] Mar. 1, 1977

[54] CYCLICAL BI-DIRECTIONAL ROTARY ACTUATOR

[75] Inventor: William C. Stange, Ellicott City, Md.

[73] Assignee: The United States of America as represented by the Administrator of the National Aeronautics and Space Administration, Washington, D.C.

[22] Filed: July 17, 1975

[21] Appl. No.: 596,787

[52] U.S. Cl. .............................. 340/224; 310/4 A; 60/527; 75/170; 337/334; 75/122.7
[51] Int. Cl.² .......................................... G08B 1/08
[58] Field of Search ......... 310/4, 4 A; 60/527-529; 318/117; 75/170, 122.7; 337/334; 340/224

[56] References Cited

UNITED STATES PATENTS

| | | | |
|---|---|---|---|
| 1,987,717 | 1/1935 | Smith | 310/4 A |
| 2,819,366 | 1/1958 | Kercher | 337/334 X |
| 3,423,608 | 1/1969 | Kerwin et al. | 318/117 X |
| 3,446,998 | 5/1969 | Murphy | 310/4 |
| 3,567,523 | 3/1971 | Jackson et al. | 75/122.7 |
| 3,663,839 | 5/1972 | Derr et al. | 310/4 A |
| 3,754,151 | 8/1973 | Clark | 310/4 A |
| 3,802,930 | 4/1974 | Brook et al. | 75/170 X |

*Primary Examiner*—Donovan F. Duggan
*Attorney, Agent, or Firm*—Ronald F. Sandler; Robert F. Kempf; John R. Manning

[57] ABSTRACT

A thermally powered rotary actuator is disclosed which is used for positioning a shaft in first and second positions which are disposed 180° apart. A pair of heat extensible springs are attached to the shaft and to the frame of the rotary actuator for selectively rotating the shaft from one of its two positions to the other position upon the application of heat to one of the heat extensible springs. The heat extensible springs are preferably constructed from the alloy 55-Nitinol. In the preferred embodiment, a detent mechanism is provided for locking the rotatable shaft in its two rotary positions.

25 Claims, 8 Drawing Figures

CYCLICAL BI-DIRECTIONAL ROTARY ACTUATOR

ORIGIN OF THE INVENTION

The invention described herein is made by an employee of the United States government and may be manufactured and used by or for the Government for governmental purposes without the payment of any royalties thereof or therefor.

BACKGROUND OF THE INVENTION

1. Field of the Invention

The invention relates to a thermally powered rotary actuator which is used for positioning a rotatable shaft in first and second positions which are disposed 180° apart. More particularly, the invention relates to a thermally powered rotary actuator which is used for positioning a magnetometer in two positions disposed 180° apart for calibration purposes.

A magnetometer is an apparatus which is used for measuring the strength of a magnetic field. The magnetometer comprises a core of magnetic material which is surrounded by a gating coil and a pickup coil. The gating coil is driven by an alternating current source which periodically saturates and desaturates the magnetic core. The lines of flux of the ambient magnetic field passing through the core change the degree of saturation of the core produced by the magnetic field of the gating coil. Accordingly, the flux of the ambient magnetic field passing through the core induces a voltage which differs from the voltage induced by the gating coil as a function of the strength of the ambient magnetic field.

Magnetometers are sensitive to magnetic fields along the axis of the magnetic core. A magnetometer is malfunctioning when different readings of the strength of the ambient magnetic field are obtained for positions of the core which are disposed 180° apart. When different readings have been obtained of the strength of the ambient magnetic field when the core is disposed 180° apart, the magnetometer must be recaliberated by introducing a correction factor to ensure proper operation. The correction factor is obtained by subtracting the reading given at the two core positions disposed 180° apart and dividing this quantity by 2 and then adding this quantity to the reading taken at the low reading position or subtracting it from the reading which is taken at the high reading position.

With the inception of interplanetary space exploration by unmanned spacecraft, it has become extremely critical to have a rotary actuator which will flip a magnetometer between first and second positions which are disposed 180° apart to permit remote calibration of the magnetometer.

2. Description of the Prior Art

Thermally powered actuators used for rotating a shaft through angular displacements are well known. These actuators generally comprise one or more bimetallic springs which are wound in a convoluted configuration and which are attached at their respective ends to the rotatable shaft and to a fixed point on a frame which rotatably supports the shaft. Application of heat to one of the bimetallic springs causes extension of the spring which rotates the shaft through an angular displacement. Thermal actuators of this type differ substantially from the present invention in that they do not include a detent mechanism for locking the shaft in first and second rotary positions which are disposed 180° apart. Moreover, the heat extensible springs used in these thermally powered motors are not constructed from an alloy possessing mechanical memory such as 55-Nitinol. U.S. Pat. Nos. 2,323,738, 2,340,170, 3,423,608, 3,446,998 and 3,663,839 each disclose thermally powered actuators of the aforementioned type which rotate a shaft through an angular displacement.

SUMMARY OF THE INVENTION

The disadvantages and limitations of the prior art thermally powered rotary actuators are obviated by the present invention which provides in the preferred embodiment a rotary actuator having the following properties: the capability of rotating a shaft cyclically back and forth through 180° + or − 15 minutes of arc between first and second positions without stopping at any intermediate rotary position and remaining locked at the first or second rotary positions between rotations; having a permanent magnetic field when not rotating which is less than $.1 \times 10^{-5}$ gauss at 1 inch of displacement from the actuator; a minimum capability of 1000 cycles of operation during a period of 5 years; completion of the rotation between the first and second positions within 15 seconds of the initiation thereof; a power requirement of not more than 10 watts of power for less than 15 seconds; a weight less than 0.5 pounds; operation with a temperature range of +10° C to +40° C and operation in a vacuum.

The preferred embodiment of the invention includes the following elements but is not limited thereto. A rotatable shaft is provided which is rotatably supported within the frame of the rotary actuator of the present invention. A pair of heat extensible springs each have their ends respectively attached to the frame and to the rotatable shaft to permit application of clockwise or counterclockwise torque to the shaft upon selective heating of one of the springs. The springs are constructed of a special alloy of 55% nickel and 45% titanium known as 55-Nitinol. A pair of electric heating elements are respectively bonded to the heat extensible springs to permit selective application of heat thereto for causing the extension of the springs to produce the clockwise or counterclockwise rotation of the rotatable shaft. A detent mechanism is provided for locking the rotatable shaft in first and second positions which are disposed 180° apart.

The construction of heat extensible springs from the 55-Nitinol constitutes an important part of the invention. It has been found that heat extensible springs constructed from 55-Nitinol possess extreme reliability when used in an environment having highly variable conditions such as the environment of outer space. Many of the properties of the preferred embodiment, discussed above, are substantially attributable to the use of springs constructed from 55-Nitinol.

DETAILED DESCRIPTION OF THE INVENTION

Figure 1:
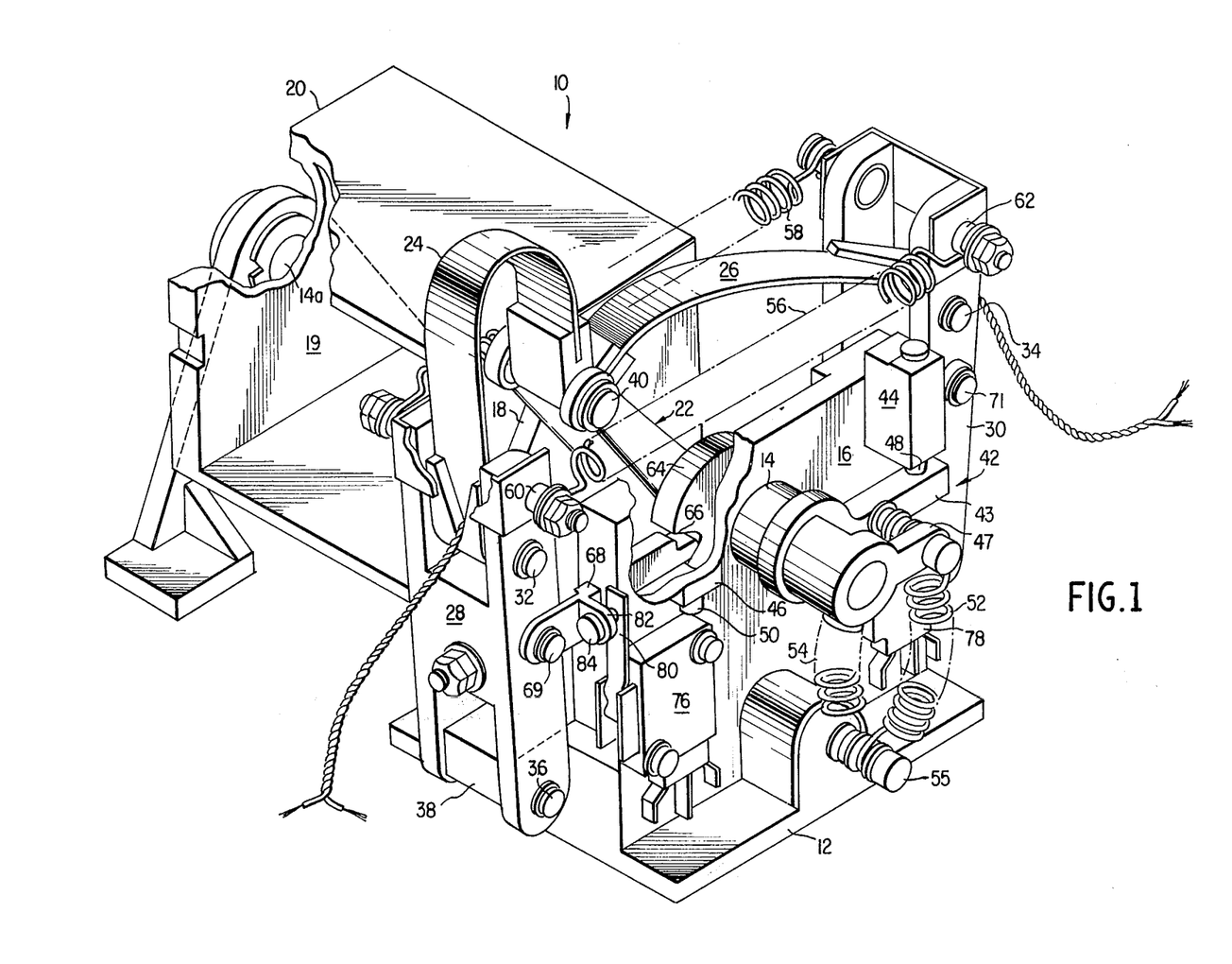
FIG. 1 is an isometric view of the preferred embodiment of the present invention.
Figure 2:
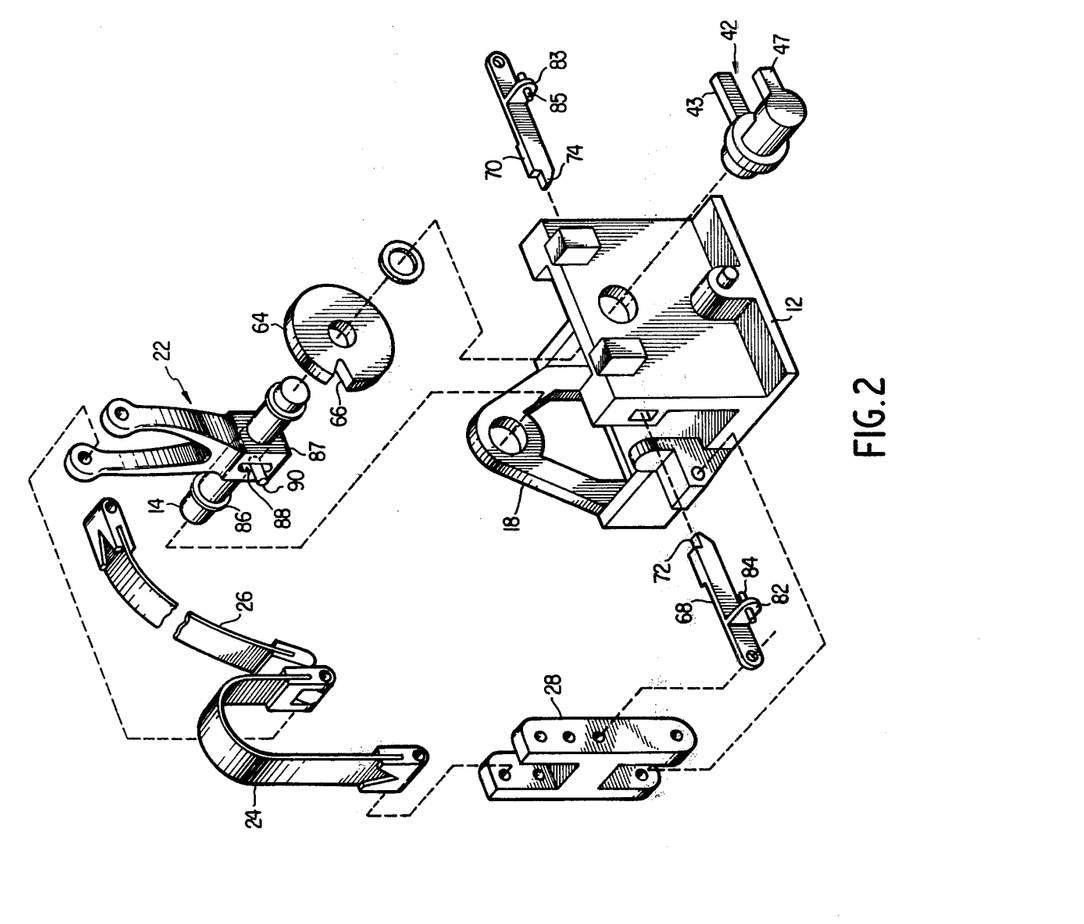
FIG. 2 is a partial exploded view of the preferred embodiment.

The preferred embodiment of a rotary actuator 10 constructed according to the present invention is described with reference to FIGS. 1 and 2. A frame 12 is provided for supporting the moving parts of the invention. Rotatable shaft 14 is journaled within walls 16 and 18 of the frame 12. A container 20 (which may house a magnetometer used for measuring the strength of magnetic fields in outer space) is connected to shaft 14. However, it should be noted that the invention may be used wherever it is necessary to cyclically rotate a shaft through a fixed angular displacement. Wall 19 of frame 12 rotatably supports shaft 14a which is connected to the inboard end of container 20. As will be more fully understood by referring to the remaining description below, the container 20 is lockable by a detent mechanism in first and second rotary positions which are disposed 180° apart. A toggled spring crank 22 is rotatably coupled at one end to shaft 14 to permit rotation of spring crank 22 with respect to shaft 14 through approximately 60° as will be explained in detail below. A pair of heat extensible springs 24 and 26 are attached to the other end of spring crank 22 by pin 40. The heat extensible springs are constructed from the alloy 55-Nitinol which possesses the property of mechanical memory. The constituents of 55-Nitinol are 55% nickel and 45% titanium. Mechanical memory enables an article constructed from 55-Nitinol to assume the shape imposed on it when it was annealed at an annealing temperature $T_a$ when the temperature of the article is raised to a transition temperature $T_t$ which is below the annealing temperature. The significance of the annealing and transition temperatures will be discussed below. The heat extensible springs 24 and 26 have bifilar thermafoil heating elements (not shown) joined to their surfaces. The heat extensible springs 24 and 26 are respectively pivotally coupled to a pair of H-shaped upstanding pivotable members 28 and 30 by pins 32 and 34. Each of the pivotable members 28 and 30 is joined to the frame 12 by a pin 36 which extends through a mounting block 38 formed integrally in frame 12. As explained above, the other end of each of the heat extensible springs 24 and 26 is pivotably coupled to the spring crank 22 by pin 40. A crank arm 42 having projections 43 and 47 is connected to the outboard end of shaft 14. A pair of mounting blocks 44 and 46 are attached to wall 16. A pair of mechanical stops 48 and 50 are respectively attached to the bottom faces of blocks 44 and 46. The bottom surface of each of the mechanical stops 48 and 50 is disposed on a line which extends through shaft 14. The function of the stops 48 and 50 is to limit rotation of the crank arm 42 when contact of either of stops 48 and 50 occurs with projection 43 after rotation of shaft 14 through 180° from the first position to the second position. A pair of compressed flexator springs 52 and 54 are each connected at one of their ends to projection 47 of crank arm 42 and at their other end to boss 55 mounted in frame 12. The flexator springs 52 and 54 cause the shaft 14 to rotate the final 90° of the 180° between the first and second rotary positions when one of the heat extensible springs 24 and 26 is heated to its transition temperature $T_t$ to produce rotation of shaft 14 and projection 43 from a position of rest against either stop 48 or 50 through 90°. Crank arm 42, including projections 43 and 47, stops 48 and 50, and springs 52 and 54 comprise a means for positioning the shaft in first and second rotary positions disposed 180° apart. A pair of stretched springs 56 and 58 are joined to the top of members 28 and 30 by attachment of their hook shape ends to a pair of horizontally disposed pins 60 and 62. Springs 56 and 58 resist the spreading force exerted by the heat extensible springs 24 and 26 when they are heated to their transition temperature.

To prevent errors in the calibration of a magnetometer caused by orientation of the magnetometer in positions disposed not exactly 180° apart, it was necessary to develop a mechanism for locking the shaft 14 into two positions which are disposed 180° apart, but which would not allow the shaft to become locked into any intermediate positions therebetween. To accomplish this objective, a detent mechanism is provided for locking the shaft 14 in two positions disposed 180° apart. The detent mechanism is best understood by referring to FIGS. 1 and 2. The detent mechanism comprises the pivotable H-shaped members 28 and 30; a circular disc 64 having its center connected to shaft 14; a V-shaped notch 66 cut in the periphery of the circular disc 64; and a pair of generally horizontally disposed locking projections 68 and 70 respectively pivotally attached to members 28 and 30 by pins 69 and 71 wherein the locking projections 68 and 70 have tappered tips 72 and 74 which are engageable in the V-shaped notch 66. As will be explained in detail in the description of the operation of the preferred embodiment below, the interaction of pivotable members 28 and 30 and locking projections 68 and 70 enables the tapered tips 72 and 74 to selectively engage the V-shaped notch 66 to lock the rotary shaft 14 in one of its two rotary positions which are disposed 180° apart. A pair of microswitches 76 and 78 are respectively mounted on wall 16 adjacent to the locking projections 68 and 70. Each of the microswitches includes a contact member 80 which extends vertically upward from the body of the microswitch. A pair of projections 82 and 83 are respectively formed integrally with each of the locking projections 68 and 70. The projections 82 and 83 respectively have set screws 84 and 85 threadedly engaged parallel to axis of the locking projections 68 and 70. The set screws 84 and 85 contact their associated contact member 80 when their associated tip 72 or 74 engages the V-shaped notch 66. Upon contact of one of the set screws 84 and 85 with its associated contact member 80, internal electrical contacts associated with either microswitch 76 or 78 close to signal that shaft 14 in one of its two rotary positions. Closure of the internal contact may be used to activate a radio transmitter (not shown) for transmitting a radio signal to a remote location that shaft 14 has rotated from one of its rotary positions to the other rotary position.

The spring crank 22 is rotatably coupled to shaft 14 for a predetermined angular displacement of approximately 60° and fixedly coupled to shaft 14 through greater angular displacements of spring crank 22 with respect to shaft 14. The limited rotatable coupling of spring crank 22 with shaft 14 permits relaxation of springs 24 and 26 from a fully extended straight configuration to a partially extended curved configuration after being heated above the transition temperature $T_t$. Shaft 14 is engaged in an aperature running through the base 87 of the spring crank 22. A slotted opening 88 is cut in the side of the base 87 of the spring crank 22 to expose the outer surface of shaft 14. A pin 90 is engaged in the outer surface of the shaft 14 for limiting the free rotation of the shaft 14 to approximately 60° (±30°) with respect to the spring crank 22. Free rotation is stopped when the pin engages the upper or lower end of the slotted opening 88. The 60° of free rotation provided between the rotary shaft 14 and the spring crank 22 permits the spring crank to rotate through an angular displacement of 120° of rotation while the shaft 14 rotates through 180°.

The construction of the heat extensible springs 22 and 24 from the alloy 55-Nitinol is an important aspect of the present invention. This alloy constitutes a mixture of 55% nickel and 45% titanium which has been specially annealed to impart a "memory" of its physical shape at the annealing temperature $T_a$. The United States Naval Ordinance Laboratory developed 55-Nitinol. The "memory" possessed by 55-Nitinol is caused by a thermally induced atomic shear transformation which occurs within 55-Nitinol when it is heated from a temperature $T_1$ below to a temperature above its transition temperature $T_t$ wherein $T_1$ is less than $T_t$ which is less than $T_a$. The salient property of this alloy is its memory of shapes imposed on it during annealing of its annealing temperature $T_a$. Simply stated, this means that any shape formed at the annealing temperature $T_a$ can be thermally induced to reoccur in spite of deformations (equal to or less than 8% strain) imposed at lower temperatures $T_1$. The 55-Nitinol used for constructing the heat extensible springs 24 and 26 has a $T_a$ equal to 500° C and a $T_t$ equal to 65° C. The transition temperature $T_t$ of 55-Nitinol is a function of material composition and cold working and can range from −100° C to +300° C. The annealing temperature is approximately 500° C. The onset of restoring stress ("memory") is not sharply defined. Therefore, the transition temperature, $T_t$, actually defines a temperature range of approximately 10° C over which the restoring stress increases by a factor of 4 to a modulus of elasticity by a factor of 4. The spring torque of heat extensible springs 24 and 26 varies directly with the yield stress of the 55-Nitinol which is solely dependent on whether its temperature is above or below transition temperature range $T_t$.

The springs 24 and 26 used in the present invention are capable of producing 40 inch-ounces of the gross torque. After approximately 1000 cycles, the gross torque output level should reduce to about 95% of the initial value. The property of the heat extensible springs 24 and 26 of producing a large amount of torque over many operational cycles without experiencing a serious drop in the level of torque is one reason why the use of 55-Nitinol heat extensible springs is an important part of the invention.

Further information concerning the fabrication and annealing of 55-Nitinol may be obtained from a publication entitled "55-Nitinol - The Alloy with a Memory; Its Physical Metallurgy. Properties and Application" NASASP5110, 1972 authored by C. M. Jackson, H. J. Wagner and R..J. Wasileski.

The operation of a rotary actuator constructed according to the preferred embodiment of the present invention may be described as follows: With the crank arm 42 starting in the position shown in FIG. 1, electric current is applied to the bifilar heater windings mounted integrally with the heat extensible spring 24 causing its temperature to rise above the transition temperature $T_t$. During the physical extension of the spring caused by heating, H-shaped member 28 pivots around pin 36 causing the tappered tip 72 of member 68 to disengage from the V-shaped notch 66. After disengagement of the tappered tip 72 from the V-shaped notch 66, shaft 14 rotates in a clockwise direction causing the projection 43 of crank arm 42 to lift away from mechanical stop 48. During the first 90° of rotation of the shaft 14, flexator springs 52 and 54 become fully compressed and the heat extensible spring 24 is partially extended to cause the toggle spring crank 22 to be disposed in a position closer to H-shaped member 30 than illustrated in FIG. 1. As soon as shaft 14 rotates more than 90°, the fully compressed flexator springs 52 and 54 expand causing shaft 14 to complete 180° of rotation. As shaft 14 approaches 180° of rotation, tappered tip 74 of locking projection 70 engages the V-shaped notch 66 to lock shaft 14 in a fixed position. Mechanical stop 50 prevents the shaft from rotating more than 180°. At this juncture, the heat extensible spring 24 is extended more fully than the configuration of springs 26 in FIG. 1 and the heat extensible spring 26 is more fully compressed than the configuration of spring 24 in FIG. 1. When the now sharply bent heat extensible spring 26 is heated, the previously described process will be reversed.

Figure 3:
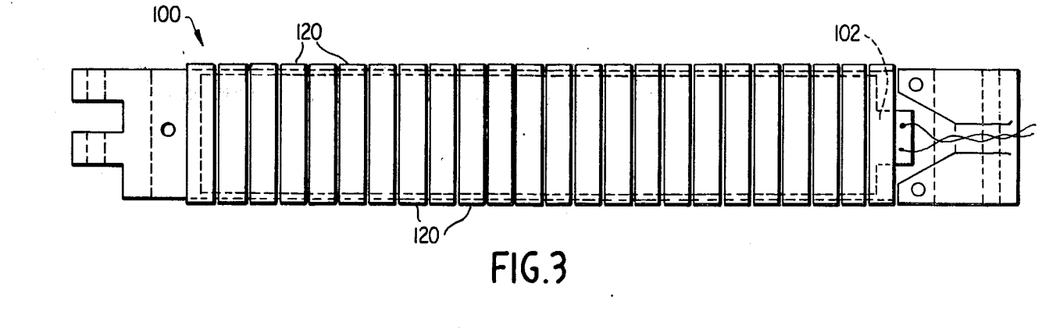
FIG. 3 is a top view of the detailed construction of the heat extensible springs used in the present invention.
Figure 4A:
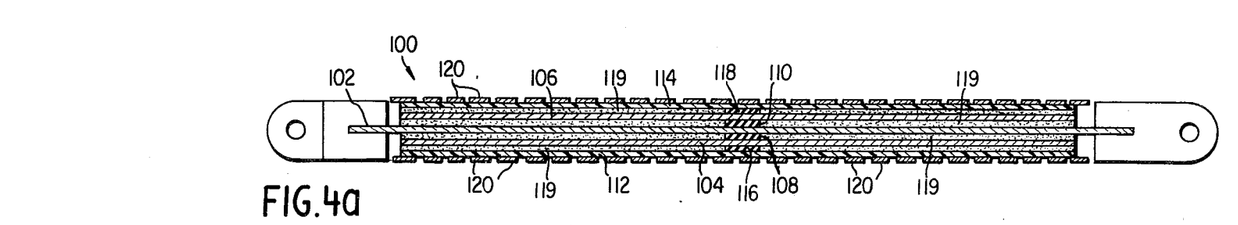
FIGS. 4a and 4b are side views of the detailed construction of the heat extensible springs used in the present invention.
Figure 4B:
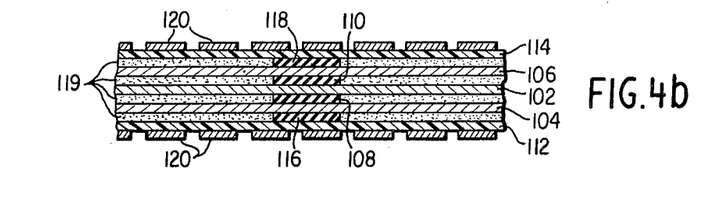

The construction of the composite 55-Nitinol heat extensible springs is described as follows with reference to FIGS. 3 and 4a and 4b. Each heat extensible spring 100 includes a strip of 55-Nitinol 102 having the properties described above. A pair of bifilar thermofoil heaters 104 and 106 are respectively bonded to the top and bottom surfaces of the 55-Nitinol spring 100 by respective one eight-inch wide bands of silicon rubber 108 and 110. Polymeric strips 112 and 114 are respectively bonded to the outside surface of the thermofoil heaters 104 and 106 by respective one 8-inch wide bands of silicon rubber 116 and 118. The strips 112 and 114 are preferably Kapton. The surfaces of the heaters 104 and 106 are then lubricated with heat conductive silicon oil 119. Then, the previously described assembly is incased with bands of heat shrinkable tubing 120. The tubing 120 is preferably polyolefin. The shrinkable bands 120 cause distributed loading of the polymeric strips 112 and 114. When bands 120 are disposed around the polymeric strips 112 and 114, flexing of the heat extensible spring 102 is not impeded. Moreover, individual bands 120 do not loosen during heating because of their heat shrinkable properties.

Figure 5:
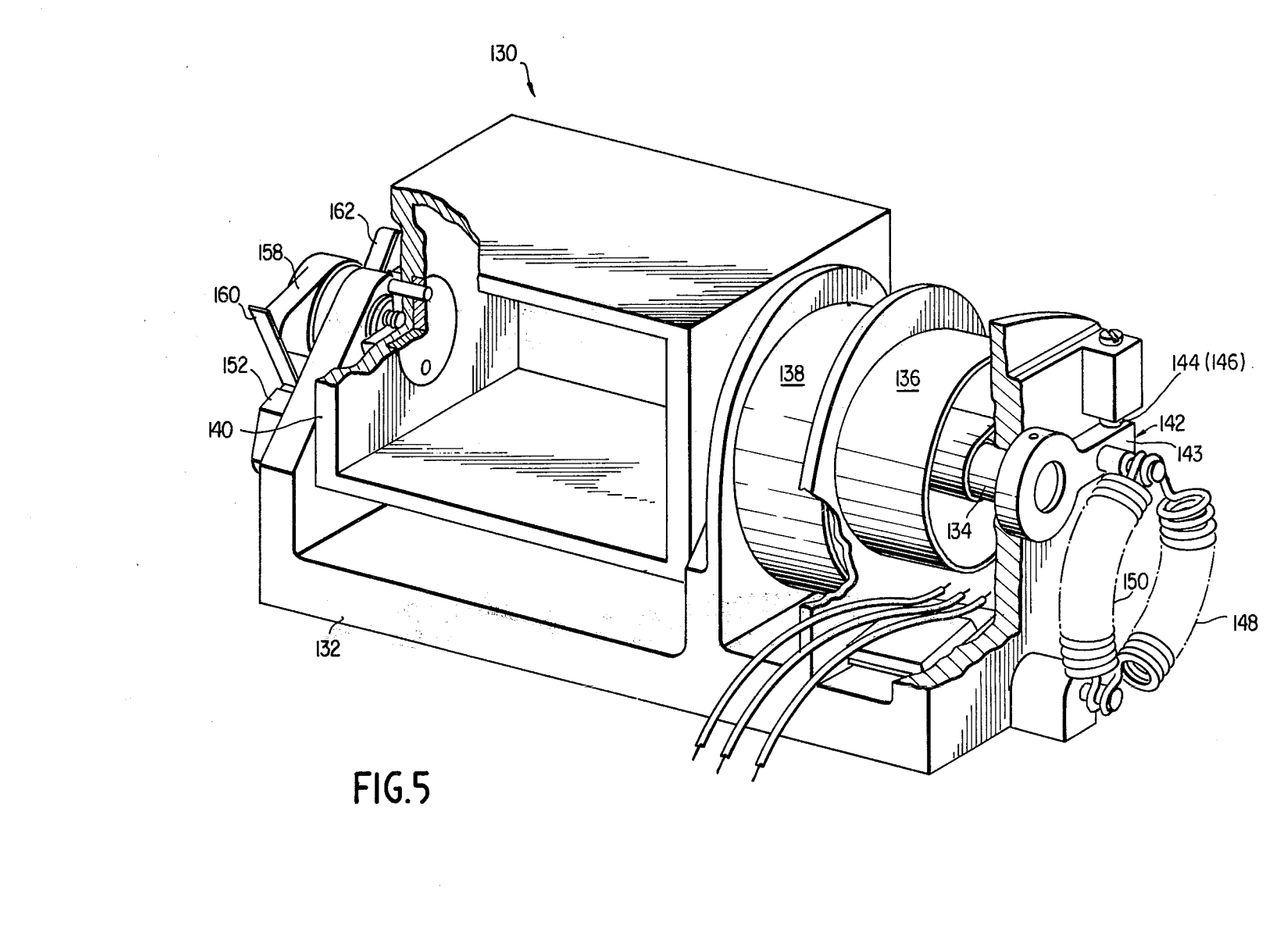
FIG. 5 is an isometric view of a second embodiment of the present invention.
Figure 6:
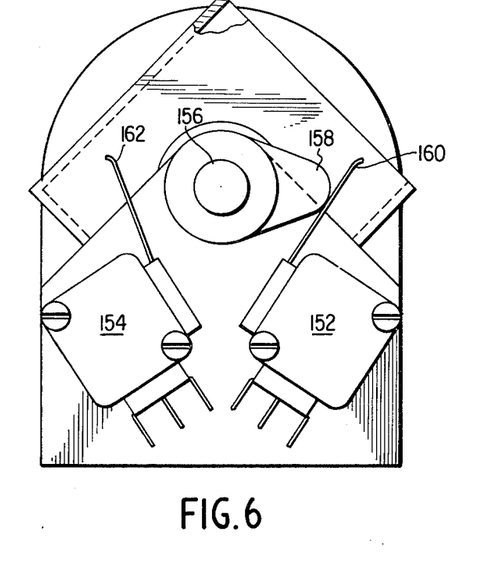
FIG. 6 is an end view of the mounting mechanism for the heat extensible springs used in the embodiment illustrated in FIG. 5.
Figure 7:
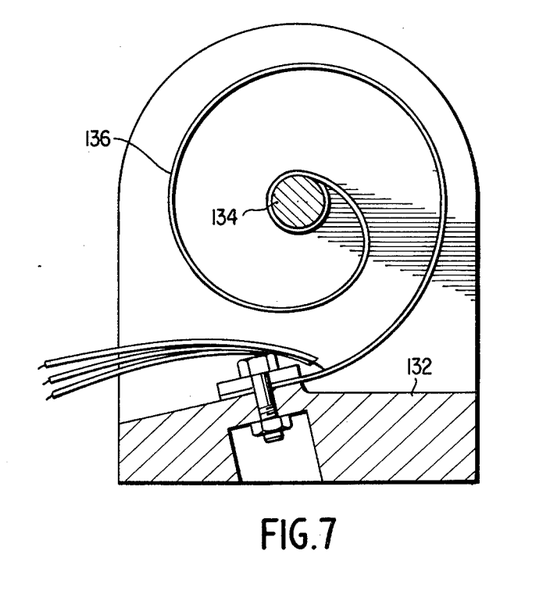
FIG. 7 is an inboard side view of the embodiment illustrated in FIG. 5.

A second embodiment of the present invention is illustrated in FIGS. 5 through 7. Rotary actuator 130 includes frame 132 which rotatably supports coaxial shafts 134 and 156 and container 140. As in the preferred embodiment, the container 140 may be used to hold a magnetometer for making measurements of the intensity of magnetic fields in outer space. However, it should be noted that the invention may be used wherever it is necessary to rotate a shaft cyclically through a fixed angular displacement. A pair of coiled heat extensible springs 136 and 138 are each coupled at one of their ends to a frame 132 and to the rotatable shaft 134 at their other end. Springs 136 and 138 respectively apply clockwise and counterclockwise torque to the shaft 134 upon heating. Each of the coiled heat extensible springs illustrated in FIGS. 3 and 4. Selective heating of either spring 136 or 138 causes its uncoiling to produce a torque which rotates shaft 134 from a first position to a second position disposed 180° from the first position. This rotation is identical to the rotation described in FIGS. 1 and 2 of the preferred embodiment of the present invention. Crank arm 142 is connected to the outboard end of the rotary shaft 134. The crank arm 142 includes a projection 143 which contacts mechanical stops 144 and 146 to limit the rotary movement of shafts 134 and 156 between the first and second positions. A pair of compressed flexator springs 148 and 150 are respectively joined at one of their ends to a boss mounted in frame 132 and to a pin which is connected to radial projection 143 of crank arm 142 at the other end. The compressed flexator springs 148 and 150 hold the shaft 134 in its first or second rotary positions by forcing the radial projection 143 of the crank arm 142 to rest against either mechanical stop 144 or 146. The bottom surface of each of the mechanical stops 144 and 146 is disposed on a line which extends through shaft 134. The crank arm 142, projection 143, mechanical stops 144 and 146, and flexator springs 148 and 150 comprise a means for positioning the shafts in first and second rotary positions disposed 180° apart. A pair of microswitches 152 and 154 are mounted on a wall disposed on the inboard side of frame 132. A cam 158 is connected to shaft 156. Cam 158 engages contact members 160 and 162 associated with microswitches 152 and 154 when rotary shafts 134 and 156 are in their first or second rotary positions. Contact of the cam 158 with either of the members 160 or 162 causes the closure of contacts contained internally within microswitches 152 and 154. The closure of the internal contacts signals that the rotary shafts 134 and 156 are disposed in either their first or second rotary positions. The closure of the contacts in the microswitches 152 and 154 may be used to activate a radio transmitter (not shown) to signal to a remote location that shafts 134 and 156 have rotated from one of their rotary positions to the other rotary position.

The operation of the embodiment illustrated in FIGS. 5 through 7 is identical to the operation of the preferred embodiment described above. Accordingly, it is only necessary to state that in the position shown in FIG. 5, the selective heating of the coiled heat extensible torsion spring 136 produces clockwise torque which rotates shaft 134 from its first rotary position, as illustrated, to a second rotary position disposed 180° away. At that position, radial projection 143 of crank arm 142 contacts stop 146 under the influence of a force produced by the compressed flexator springs 148 and 150. Rotation of the shafts 134 and 156 from this position back to the position illustrated in the FIG. 5 involves the selective heating of coiled heat extensible torsion spring 138.

While the invention has been disclosed as a preferred embodiment and additional embodiment thereof, it should nevertheless be understood that numerous modifications can be made to the invention without parting from the spirit and scope thereof. Accordingly, it is intended that all such modifications fall within the scope of the appended claims.

What I claim is:

1. A thermally powered actuator comprising:
   a. frame means;
   b. shaft means rotatably supported in said frame means;
   c. means for positioning said shaft means in first and second rotary positions disposed 180° apart;
   d. at least one pair of heat extensible spring means having first and second ends, said first ends being coupled to said rotatable shaft means, said spring means respectively applying clockwise or counterclockwise torque to said shaft means upon application of heat thereto;
   e. heating means bonded to each of said spring means for applying heat thereto to cause their selective extension;
   f. spring crank means coupled to said rotatable means and pivotally coupled to said second ends of said spring means; and
   g. coupling means disposed between said shaft means and said crank means, said coupling means permitting free rotation of said crank means with respect to said shaft means for a predetermined angular displacement of said crank means with respect to said shaft means and unitary rotation of said crank means and said shaft means for angular rotations of said crank means with respect to said shaft means which are greater than said predetermined angular displacement.

2. A thermally powered actuator as recited in claim 1 further comprising:
   a. means for detaining said shaft means in two fixed positions disposed 180° apart.

3. A thermally powered actuator as recited in claim 1 wherein:
   a. said predetermined angular displacement is approximately equal to 60°.

4. A thermally powered actuator as recited in claim 3 wherein said coupling means comprises:
   a. an aperature extending through said spring crank means, said aperature having said shaft means disposed therein;
   b. a section cut from an outside surface of said spring crank means disposed adjacent said aperature into said spring crank means to expose the outer surface of said shaft means disposed in said aperature; and
   c. a pin mounted in the section of said shaft means disposed within said aperature of said spring crank means, said pin projecting outward from said shaft means into said section, said pin being rotatable through approximately 60° with respect to said crank means before movement of said pin is stopped by contact with said open section.

5. A thermally powered actuator as recited in claim 2 further comprising:
   a. a first member pivotally coupled to said frame means;
   b. a second member pivotally coupled to said frame means; and wherein:
   c. said first ends of said spring means are respectively pivotally coupled to said first and second members.

6. In a thermally powered actuator as recited in claim 5 wherein said means for detaining comprises:
   a. a circular disc connected to said rotatable shaft means, said disc having a V-shaped notch cut in its circular periphery;
   b. first and second locking projections each having first and second ends, said first ends of said first and second locking projections being respectively pivotally coupled to said first and second members which are pivotally coupled to said frame means, said second ends of said locking projections each comprising a tip which is adapted to engage said V-shaped notch when said shaft means is in its first or second rotary positions.

7. A thermally powered actuator as recited in claim 6 further comprising:
   a. at least one stretched spring having first and second ends, said first end being coupled to said first pivotable member and said second end being coupled to said second pivotable member.

8. In a thermally powered actuator as recited in claim 1 wherein said means for positioning comprises:
   a. a crank arm connected to said shaft means, said crank arm having first and second projections extending outward from said shaft means;
   b. at least one compressed spring having first and second ends, said first end being coupled to said frame means and said second end being coupled to said second projection of said crank arm;
   c. at least a pair of walls joined to said frame means, said walls rotatably supporting said shaft means; and
   d. a pair of mechanical stops mounted on one of said walls at a position which is within the volume swept out by rotation of said first projection of said crank arm, one surface of each of said mechanical stops being disposed on a line running diametrically through said shaft means to limit rotation of said shaft to 180°.

9. In a thermally powered actuator as recited in claim 1 wherein:
   a. when said shaft means is disposed in either said first or said second rotary position, one of said heat extensible spring means is in an extended slightly curved configuration and the other heat extensible spring means is in a bent configuration, said bend subtending approximately 180°.

10. A thermally powered actuator comprising:
    a. a frame;
    b. a shaft rotatably supported in said frame;
    c. means for positioning said shaft in first and second rotary positions disposed 180° apart;
    d. a pair of heat extensible springs having first and second ends, said first ends being coupled to said rotatable shaft, said springs applying clockwise or counterclockwise torque to said shaft upon application of heat rotation;
    e. a pair of heating elements respectively bonded to said springs for applying heat thereto to cause selective extension of said springs;
    f. a first and second member spaced apart on opposite sides of said shaft and pivotally coupled to said frame, said first ends of said springs being respectively pivotally coupled to said first and second members; and
    g. means for detaining said shaft in two fixed positions disposed 180° apart comprising:
       1. a circular disc connected to said rotatable shaft, said disc having a V-shaped notch cut in its circular periphery, and
       2. first and second locking projections each having first and second ends, said first ends of said first and second locking projections being respectively pivotally coupled to said first and second members which are pivotally coupled to said frame, said second ends each having a tip which is adapted to engage said V-shaped notch when said shaft is in its first or second rotary positions.

11. A thermally powered actuator as recited in claim 10 further comprising:
    a. a spring crank coupled to said rotatable shaft and pivotally coupled to said second end of said springs.

12. A thermally powered actuator as recited in claim 11 further comprising:
    a. a coupling disposed between said shaft and said spring crank, said coupling permitting free rotation of said spring with respect to said shaft for a predetermined angular displacement of said spring crank with respect to said shaft and unitary rotation of said spring crank and said shaft for angular rotations of said spring crank with respect to said shaft which are greater than said predetermined angular displacement.

13. A thermally powered actuator as recited in claim 12 wherein:
    a. said predetermined angular displacement is approximately equal to 60°.

14. A thermally powered actuator as recited in claim 13 wherein said coupling comprises:
    a. an aperature extending through said spring crank which is coupled to said shaft, said aperature having said shaft disposed therein;
    b. a section cut from an outside surface of said spring crank disposed adjacent said aperature into said spring crank to expose the outer surface of said shaft disposed in said aperature; and
    c. a pin mounted in the section of said shaft disposed within said aperature of said spring crank, said pin projected outward from said shaft into said open section, said pin being rotatable through approximately 60° with respect to said spring crank before movement of said pin is stopped by contact with said open section.

15. A thermally powered actuator as recited in claim 10 further comprising:
    a. at least one stretched spring having first and second ends, said first end being coupled to said first pivotable member and said second end being coupled to said second pivotable member.

16. In a thermally powered actuator as recited in claim 10 wherein said means for positioning comprises:
    a. a crank arm connected to said shaft, said crank arm having first and second projections extending outward from said shaft;
    b. at least one compressed spring having first and second ends, said first end of said compressed spring being coupled to said frame and said second end of said compressed spring being coupled to said second projection of said crank arm;
    c. at least a pair of walls joined to said frame, said walls rotatably supporting said shaft; and
    d. a pair of mechanical stops mounted on one of said walls at a position which is within the volume swept out by rotation of said first projection of said crank arm, one surface of each of said mechanical stops being disposed on a line running diametrically through said shaft to limit rotation of said shaft to 180°.

17. In a thermally powered actuator as recited in claim 10 wherein:
    a. when said shaft is disposed at either said first or said second rotary positions, one of said heat extensible springs is in an extended slightly curved configuration and the other heat extensible spring is in a bent configuration, said bend subtending approximately 180°.

18. In a thermally powered actuator as recited in claim 10 further comprising:
   a. means for signaling when said shaft is in said first or second rotary positions.

19. In a thermally powered actuator as recited in claim 18 wherein said means for signaling comprises:
   a. first and second microswitches disposed on a wall rotatably supporting said shaft, said microswitches having electrical contacts;
   b. first and second contact members extending respectively upward from said first and second microswitches;
   c. first and second projections respectively integrally formed with said first and second locking projections of said detaining means for engaging one of said contact members when one of said locking projections engages said V-shaped notch; and
   d. a radio transmitter coupled to said microswitches, said radio transmitter being activated by the closure of said contacts of said microswitches when one of said projections integrally formed on said locking projections engages its associated contact member.

20. In a thermally powered actuator as recited in claim 18 wherein said signaling means comprises:
   a. first and second microswitches mounted on a wall rotatably supporting said shaft, said microswitches each having electrical contacts;
   b. first and second contact members respectively extending upward from said microswitches;
   c. a cam connected to said shaft, said cam sweeping out a volume which engages said first and second contact members when said shaft is respectively in said first and second positions; and
   d. a radio transmitter electrically coupled to said microswitches, said radio transmitter being activated by closure of said contacts of said microswitches when said cam contacts said contact members.

21. A heat extensible spring which changes from a first shape to a second shape upon heating from a lower temperature $T_1$ to a higher transition temperature $T_t$ comprising:
   a. a strip of the alloy 55-Nitinol having first and second sides and which has been annealed at a temperature $T_a$ of approximately 500° C;
   b. first and second electrical heaters each having first and second sides, the first side of said first heater being attached to the first side of said strip and the first side of said second electrical heater being attached to the second side of said strip;
   c. first and second polymeric strips each having first and second sides, said first side of said first polymeric strip being attached to said second side of said first electrical heater, and said first side of said second polymeric strip being attached to the second side of said second electrical heater;
   d. a plurality of heat shrinkable bands disposed around said strip of 55-Nitinol and in surface contact with the second surfaces of said first and second polymeric strips; and wherein
   e. $T_t$ ranges from $-196°$ C to $+100°$ C and is a function of material composition and cold working.

22. A heat extensible spring as recited in claim 21 wherein:
   a. $T_t$ equals 80° C; and
   b. $T_a$ equals 500° C.

23. In a heat extensible spring as recited in claim 21 wherein:
   a. said electrical heaters are attached to said 55-Nitinol strip and said polymeric strips by silicon rubber cement;
   b. said polymeric strips are constructed from Kapton; and
   c. the exposed surfaces of said electrical heaters are coated with heat conductive silicon oil.

24. In a heat extensible spring as recited in claim 21 wherein:
   a. said heat shrinkable bands are constructed from polyolerin.

25. A thermally powered actuator as recited in claim 1 wherein said heat extensible spring means are constructed from the alloy of 55-Nitinol.

* * * * *